United States Patent
Greene (10) Patent No.: US 10,382,814 B2
(45) Date of Patent: *Aug. 13, 2019

(54) APPARATUS, SYSTEMS AND METHODS FOR CONTROL OF MEDIA CONTENT EVENT RECORDING

(71) Applicant: EchoStar Technologies L.L.C., Englewood, CO (US)

(72) Inventor: Gregory Greene, Littleton, CO (US)

(73) Assignee: DISH TECHNOLOGIES L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/972,896

(22) Filed: May 7, 2018

(65) Prior Publication Data
US 2018/0332336 A1   Nov. 15, 2018

Related U.S. Application Data

(63) Continuation of application No. 15/289,372, filed on Oct. 10, 2016, now Pat. No. 9,967,612, which is a
(Continued)

(51) Int. Cl.
| | |
|---|---|
| H04N 21/433 | (2011.01) |
| H04N 21/4147 | (2011.01) |
| H04N 21/45 | (2011.01) |
| G06T 7/20 | (2017.01) |
| H04N 21/44 | (2011.01) |
| G06K 9/00 | (2006.01) |

(52) U.S. Cl.
CPC ..... *H04N 21/4334* (2013.01); *G06K 9/00456* (2013.01); *G06K 9/00744* (2013.01); *G06T 7/20* (2013.01); *H04N 21/4147* (2013.01); *H04N 21/44008* (2013.01); *H04N 21/45* (2013.01)

(58) Field of Classification Search
None
See application file for complete search history.

(56) References Cited

U.S. PATENT DOCUMENTS

| | | | | |
|---|---|---|---|---|
| 5,875,263 A | * | 2/1999 | Froessl | G06F 16/40 382/181 |
| 6,771,885 B1 | * | 8/2004 | Agnihotri | H04N 5/782 386/314 |

(Continued)

*Primary Examiner* — An Son P Huynh
(74) *Attorney, Agent, or Firm* — Lowe Graham Jones PLLC; Raymond Armentrout (57) ABSTRACT

Systems and methods are operable to record a media content event at a media device. An exemplary embodiment grabs a series of subsequently received image frames from the media content event that is being recorded after a monitored real time reaches a closing credits monitor time, wherein the closing credits monitor time is a recording end time less a predefined duration. The embodiment then analyzes each of the image frames to identify an occurrence of text presented in the analyzed image frame, determines that the identified text corresponds to closing credits of the media content event if the at least one attribute of the identified text matches a corresponding predefined closing credits attribute, and initiates an end of the recording of the media content event in response to determining that the identified text corresponds to the closing credits of the media content event.

5 Claims, 1 Drawing Sheet

Related U.S. Application Data continuation of application No. 14/854,321, filed on Sep. 15, 2015, now Pat. No. 9,465,996.

(56) References Cited

U.S. PATENT DOCUMENTS

| | | |
|---|---|---|
| 7,478,206 B2 | 1/2009 | Nakamura et al. |
| 8,205,234 B1 | 6/2012 | Eguchi et al. |
| 8,380,050 B2 | 2/2013 | Kummer |
| 8,479,238 B2 | 7/2013 | Chen |
| 9,317,853 B2 | 4/2016 | Dhawan |
| 9,510,044 B1 | 11/2016 | Pereira |
| 9,536,161 B1 | 1/2017 | Lish |
| 2002/0087979 A1 | 7/2002 | Dudkiewicz et al. |
| 2005/0271304 A1 | 12/2005 | Retterath |
| 2006/0171274 A1 | 8/2006 | Moon |
| 2006/0187358 A1 | 8/2006 | Lienhart |
| 2006/0248569 A1 | 11/2006 | Lienhart |
| 2007/0133938 A1 | 6/2007 | Park |
| 2007/0261070 A1 | 11/2007 | Brown |
| 2008/0134251 A1 | 6/2008 | Blinnikka |
| 2009/0257732 A1 | 10/2009 | Callaway et al. |
| 2011/0282906 A1 | 11/2011 | Wong |
| 2012/0099795 A1 | 4/2012 | Jojic et al. |
| 2013/0212609 A1 | 8/2013 | Sinha |
| 2013/0276033 A1 | 10/2013 | Francini et al. |
| 2014/0007162 A1 | 1/2014 | Harrison |
| 2014/0064711 A1 | 3/2014 | Ziskind |
| 2014/0122889 A1 | 5/2014 | Freund |
| 2014/0245335 A1 | 8/2014 | Holden |
| 2015/0281778 A1* | 10/2015 | Xhafa ............... H04N 21/4583 386/292 |

* cited by examiner

US 10,382,814 B2

APPARATUS, SYSTEMS AND METHODS FOR CONTROL OF MEDIA CONTENT EVENT RECORDING

APPLICATION PRIORITY

This patent application is a Continuation of U.S. patent application Ser. No. 15/289,372, filed Oct. 10, 2016, issued as U.S. Pat. No. 9,967,612 on May 8, 2018, and which is a continuation of U.S. patent application Ser. No. 14/854,321, filed Sep. 15, 2015, entitled "APPARATUS, SYSTEMS AND METHODS FOR CONTROL OF MEDIA CONTENT EVENT RECORDING," and issued as U.S. Pat. No. 9,465,996 on Oct. 11, 2016, the contents of which is herein incorporated by reference in their entirety.

BACKGROUND

Media devices, such as a set top box, a computer system, or another electronic device, are configured to receive media content events that are broadcast by a media content provider over a broadcast type communication system. The media content provider concurrently broadcasts many media content events to a plurality of media devices, typically in one or more media content streams that are communicated to the media devices over a media system sourced from a remote head end facility operated by the media content provider. Non-limiting examples of such media systems include a satellite system, a cable system, a radio frequency (RF) communication system, and the Internet.

Typically, the media content event is theme based. The thematic media content event presents theme-based visual and audio content to a user for their enjoyment and/or for informative purposes. Examples of such theme-based media content events include movies, films, serial programming, sporting events, documentaries, newscasts, religious programs, commercials (typically of short duration with advertising content), or the like. Serial programming may present a continuing plot and/or theme, often with the same cast of actors, in a sequential episode-by-episode basis that is available periodically.

Users of a particular media device are able to identify the broadcast times and/or channels of particular media content events of interest by viewing an Electronic Program Guide (EPG). Typically, the EPG presents information about the broadcast schedule of the media content events. The EPG, for any particular media content event, indicates a scheduled broadcast start time, a scheduled broadcast end time, a channel identifier that identifies the channel that is broadcasting the media content event, and supplemental information describing the media content event (such as the title and/or other descriptive information).

In some situations, the user of the media device may configure their media device to record a currently broadcasting media content event and/or a media content event that is scheduled for future broadcast to the media device. Here, the media device is configured to begin recording (storing) at a recording start time and end recording at a recording end time. The recording end and start times are determinable from the EPG information which specifies the scheduled broadcast start time and the scheduled broadcast end time for the selected media content event. In some media devices, the user may specify the recording end and start times, and the broadcasting channel, to define a recording of a particular media content event of interest.

As the selected media content event is being received at the media device during its broadcast, the received media content event is stored into a recording media in accordance with the recording request initiated by the user. That is, the media device determines the recording start time (which corresponds to the EPG information that specifies the scheduled broadcast start time) and the recording end time (which corresponds to the EPG information that specifies the scheduled broadcast end time). When the recording start time occurs (when the actual time reaches the recording start time), the media device tunes to the channel (identified in the EPG information) that is broadcasting the selected media content event, and then begins the process of recording the broadcasting media content event. When the recording end time is reached (when the actual time reaches the recording end time), the recording process ends.

Often, the user is not present to personally view the recorded media content event as it is being received by the media device. Thus, the user may later view the recorded media content event at their convenience.

In some instances, the recording end time does not match the actual broadcast end time. If the actual broadcast end time extends beyond the scheduled broadcast end time, and thus extends beyond the recording end time, then a concluding portion of the media content event will not be recorded by the media device. Often, such failures to record the concluding portion of a media content event are very frustrating to the user.

Various approaches to resolving the failure to record the concluding portion of the media content event have been devised. For example, some media devices are configured to automatically adjust the recording end time by some predefined duration (amount of time). That is, the EPG specified scheduled broadcast end time is identified, and then the predefined duration is added thereto to define the recording end time, such as one or more minutes. Thus, it is very probable that the entirety of the media content event will be recorded (along with some beginning portion of the next broadcasted media content event, which the user may simply ignore).

Yet in some instances, the final concluding portion of the media content event may not be recorded in situations. For example, the actual broadcast end time may extend beyond the adjusted recording end time, such as when a sporting event play time is extended by one or more overtime play periods, or a broadcast is interrupted by a special news event report.

Accordingly, there is a need in the arts to further improve the process of recording media content events so as to ensure that the concluding portion of the media content event is reliably recorded.

SUMMARY

Systems and methods of recording a media content event at a media device are disclosed. An exemplary embodiment grabs a series of subsequently received image frames from the media content event that is being recorded after a monitored real time reaches a closing credits monitor time, wherein the closing credits monitor time is a recording end time less a predefined duration. The embodiment then analyzes each of the image frames to identify an occurrence of text presented in the analyzed image frame, determines that the identified text corresponds to closing credits of the media content event if the at least one attribute of the identified text matches a corresponding predefined closing credits attribute, and initiates an end of the recording of the media content event in response to determining that the identified text corresponds to the closing credits of the media content event.

BRIEF DESCRIPTION OF THE DRAWINGS

Preferred and alternative embodiments are described in detail below with reference to the following drawing.

DETAILED DESCRIPTION

Figure 1:
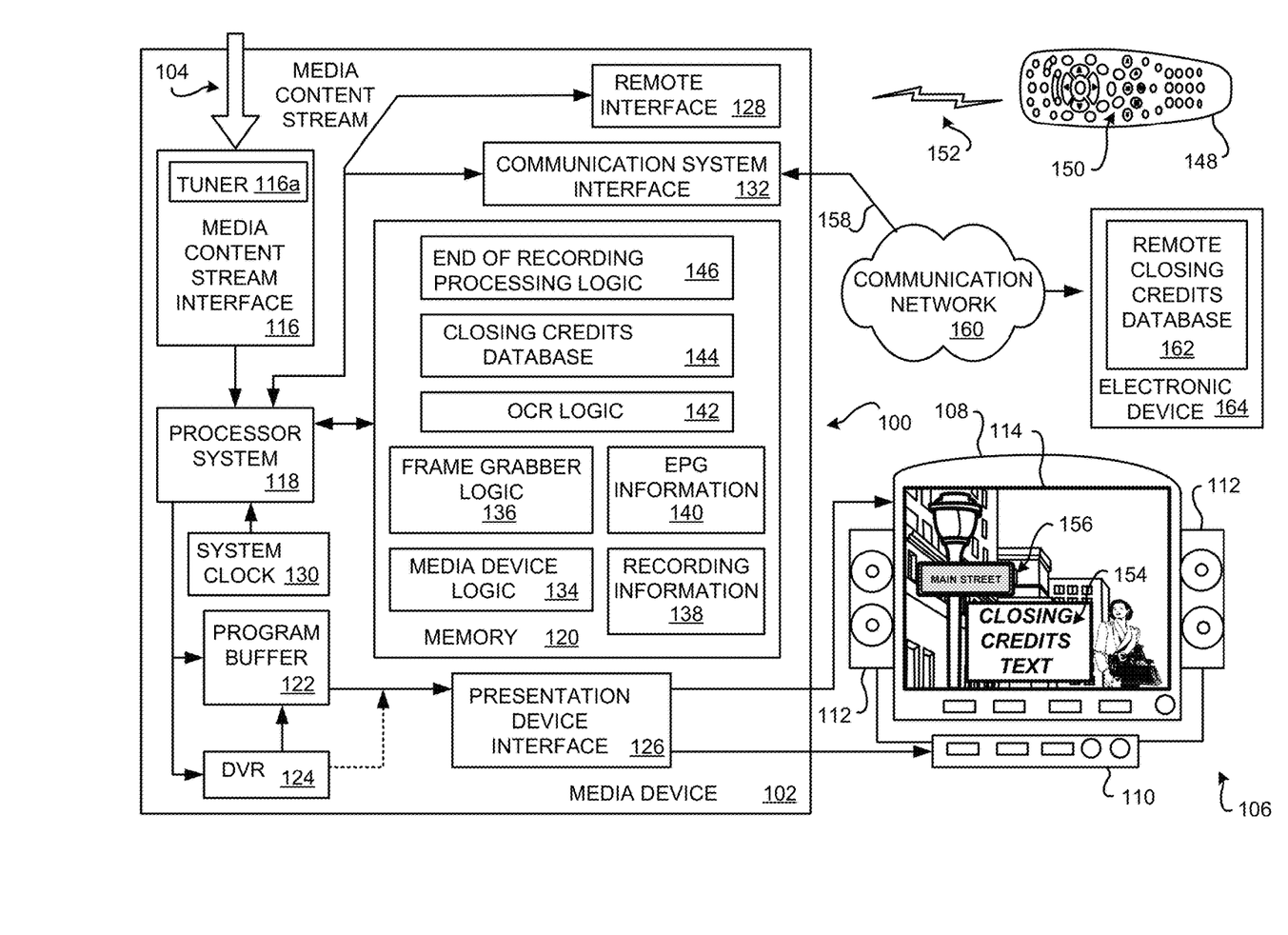
FIG. 1 is a block diagram of an embodiment of an end of recording management system implemented in a media device.

FIG. 1 is a block diagram of an embodiment of an end of recording management system 100 implemented in a media device 102, such as, but not limited to, a set top box (STB). Embodiments of the end of recording management system 100 may be implemented in other media devices, such as, but not limited to a digital video disc (DVD) player, a digital video recorder (DVR), a personal device assistant (PDA), a game playing device, a personal computer (PC), a smart phone, a note pad, or a netbook that are configured to present and/or record a video-based media content event that is received in a broadcasted media content stream 104.

Embodiments of the end of recording management system 100 are configured to monitor a concluding portion of a received media content event to identify the end of the media content event based upon detection of the closing credits of a currently recording media content event. Based on identification of the closing credits in the video portion of the media content event that occur near the end of the recording media content event, the process of ending the recording of the media content event can be initiated.

An example embodiment searches one or more image frames of the concluding portion of the media content event for text associated with the closing credits. Such text associated with the closing credits portion of the media content event are appreciated by one skilled in the arts to be presented in a media content event at or very near its ending. Accordingly, the detection of the concluding portion of the media content event enables the end of recording management system 100 to determine when to end the current recording of the media content event.

For example, a non-limiting embodiment detects the closing credits portion of the media content event using an optical character recognition process. Optionally, the recognized text is compared to associated closing credit information retrieved from a database. In an example embodiment, the media device 102 then continues to monitor for an ending of the closing credits portion, such as when the closing credits are no longer presented (and thus are no longer detectable). Here, the conclusion of presentation of the closing credits is associated with the end of the currently recording media content event.

Alternative embodiments determine the end of the currently recording media content event in other manners described herein. For example, other embodiments may determine the end of the media content event based on other image analysis techniques that identify one or more other image features that are associated with the ending of the currently recording media content event. Some embodiments may determine the end of the currently recording media content event based on detection of multiple image attributes and/or other features, such as expiration of a delay duration after detection of either the beginning or the end of the closing credits.

The exemplary media device 102 is communicatively coupled to a media presentation system 106 that includes a visual display device 108, such as a television (hereafter, generically a TV), and an audio presentation device 110, such as a surround sound receiver controlling an audio reproduction device (hereafter, generically, a speaker 112). Other types of output devices may also be coupled to the media device 102, including those providing any sort of stimuli sensible by a human being, such as temperature, vibration and the like. The video portion of the media content event is displayed on the display 114 and the audio portion of the media content event is reproduced as sounds by one or more speakers 112. In some embodiments, the media device 102 and one or more of the components of the media presentation system 106 may be integrated into a single electronic device.

The non-limiting exemplary media device 102 comprises a media content stream interface 116, a processor system 118, a memory 120, a program buffer 122, an optional digital video recorder (DVR) 124, a presentation device interface 126, a remote interface 128, an optional system clock 130, and an optional communication system interface 132. The memory 120 comprises portions for storing the media device logic 134, the frame grabber logic 136, the recording information 138, the electronic program guide (EPG) information 140, the optical character recognition (OCR) logic 142, the optional closing credits database 144, and the end of recording processing logic 146. In some embodiments, the media device logic 134, the frame grabber logic 136, the optical character recognition logic 142, and/or the end of recording processing logic 146 may be integrated together, and/or may be integrated with other logic. In some embodiments, the recording information 138, the electronic program guide (EPG) information 140, and/or the closing credits database 144 may be implemented in other memory media and/or may be incorporated with other data. In other embodiments, some or all of these memory and other data manipulation functions may be provided by using a remote server or other electronic devices suitably connected via the Internet or otherwise to a client device. Other media devices may include some, or may omit some, of the above-described media processing components. Further, additional components not described herein may be included in alternative embodiments.

The functionality of the media device 102, here a set top box, is now broadly described. In a satellite broadcast system, a media content provider provides media content that is received in one or more multiple media content streams 104 multiplexed together in one or more transport channels. The transport channels with the media content streams 104 are communicated to the media device 102 from a media system sourced from a remote head end facility (not shown) operated by the media content provider. The media device 102 is configured to receive one or more broadcasted satellite signals detected by an antenna (not shown). Non-limiting examples of other media systems that broadcast a media content stream 104 include a cable system, a radio frequency (RF) communication system, and the Internet.

The one or more media content streams 104 are received by the media content stream interface 116. In a broadcast environment, one or more optional tuners 116a in the media content stream interface 116 selectively tune to one of the media content streams 104 in accordance with instructions received from the processor system 118. The processor system 118, executing the media device logic 134 and based upon a request for a particular media content event of interest specified by a user for current viewing or for recording, parses out media content associated with the media content event of interest. The media content event of interest is then assembled into a stream of video and/or audio information which may be stored by the program buffer 122 such that the media content can be streamed out to components of the media presentation system 106, such as the visual display device 108 and/or the audio presentation device 110, via the presentation device interface 126. Alternatively, or additionally, the parsed out media content may be saved into the DVR 124 for later presentation, interchangeably referred to herein as "recording" of the media content event. The DVR 124 may be directly provided in, locally connected to, or remotely connected to, the media device 102. In alternative embodiments, the media content streams 104 may stored for later decompression, processing and/or decryption.

From time to time, information populating the EPG information 140 portion of the memory 120 is communicated to the media device 102, via the media content stream 104 or via another suitable media. The EPG information 140 portion of the memory 120 stores the information pertaining to the scheduled programming of media content events. The information may include, but is not limited to, a scheduled broadcast start time, a scheduled broadcast end time, a channel identifier that identifies the channel that is broadcasting the media content event, and supplemental information describing the media content event. The media content event's descriptive supplemental information may include the title of the media content event, names of performers or actors, date of creation, and a summary describing the nature of the media content event. Any suitable information may be included in the supplemental information. Upon receipt of a command from the user requesting presentation of an EPG display, the information in the EPG information 140 is retrieved, formatted, and then presented on the display 114 as an EPG, wherein the scheduled broadcast start and end times, the channel identifier, and the supplemental information for currently presenting and future scheduled media content events are presented to the viewing user.

The exemplary media device 102 is configured to receive commands from a user via a remote control 148. The remote control 148 includes one or more controllers 150 disposed on the surface of the remote control 148. The user, by actuating one or more of the controllers 150, causes the remote control 148 to generate and transmit commands, via a wireless signal 152, to the media device 102. The commands control the media device 102 and/or control the devices of media presentation system 106. The wireless signal 152 may be an infrared (IR) signal or a radio frequency (RF) signal that is detectable by the remote interface 128. In some embodiments, one or more of the controllers 150 are configured to activate and deactivate (toggle) the end of recording management system 100 between an operating state and a non-operating state. The non-operating state may be of interest to the user in various situations, such as back-to-back recordings of media content events that are broadcast on different channels.

The processes performed by the media device 102 relating to the processing of the received media content stream 104 and communication of a presentable media content event to the components of the media presentation system 106 are generally implemented by the processor system 118 while executing the media device logic 134. Thus, the media device 102 may perform a variety of functions related to the processing and presentation of one or more media content events received in the media content stream 104.

Typically, a media content event presents theme-based visual and audio content to a user for their enjoyment and/or for informative purposes. Examples of such theme-based content includes movies, films, serial programming, sporting events, documentaries, newscasts, religious programs, commercials (typically of short duration with advertising content), or the like. Serial programming may present a continuing plot and/or theme, often with the same cast of actors, in a sequential episode-by-episode basis that is available periodically. Advertisements, commercials or the like may be interspersed within the media content event.

In a broadcast environment, the media content event is broadcast to a plurality of media devices 102 as a stream of media content residing in the media content stream 104. Typically, at any given instant in time, the media device 102 may be receiving one or more media content streams 104 with hundreds of, or even thousands of, concurrently broadcast streaming media content events. Typically, presentation of a media content event occurs over some time span (duration). Thus, the media content event has a beginning portion that usually includes identifying information about the media content event, such as music, text of a title, or other information. When the user views this beginning portion of the media content event, the user intuitively understands that they are viewing the beginning of the media content event.

If the user is viewing a live broadcast of a particular media content event of interest, the media content event of interest is presented as it is being received by the media device 102. Accordingly, as the media content event of interest is being initially broadcast, presentation of the media content event of interest to the user can begin at the actual broadcast start time of the media content event of interest. The actual broadcast start time is the time that the media content event of interest is received at the media device 102 (plus some relatively short additional amount of time required for processing of the media content event by the media device 102 and the components of the media presentation system 106).

As time progresses, the entirety of the streaming media content event of interest is presented to the user as the stream of media content is being received in the media content stream 104. At some point, the media content event of interest comes to its end (conclusion). A viewing user intuitively understands that the media content event of interest is ending upon viewing the closing credits portion of the media content event. Such closing credits portion of the media content event typically include the closing credits text, wherein the closing credits text is visible to the user. Ultimately, after the closing credits have been presented, presentation of the media content event of interest ends.

When a media content event is viewed during its live broadcast, the end of the presentation of the media content event corresponds to the actual broadcast end time. The actual broadcast end time is the time that the very end of the media content event of interest is received at the media device 102 (plus some relatively short additional amount of time required for processing of the end of the media content event by the media device 102 and the components of the media presentation system 106).

Typically, when the user is viewing a live broadcast of the media content event, a next media content event begins immediately after the conclusion of the media content event of interest. Alternatively, one or more commercials or the like may next be presented to the user prior to the initial broadcast of the next live broadcast media content event. The beginning of the next program and/or any intervening commercials will be discernible from the closing credits portion of the media content event that is being recorded.

During operation of the media device 102 by the user, the media device 102 is configured to generate and present an EPG on the display 114 to facilitate informing the user of the particular media content events that are currently available. The user, when viewing the EPG, is able to select a currently received live broadcast media content event for presentation.

The EPG is a type of a user interface that presents a menu, or a series of menus, that describe available media content events that are available for presentation. The EPG has the look and feel of a table that uses a combination of text and/or symbols to indicate the media content event viewing choices that may be selected by the user. The media content event information presented on the EPG may include the title of available program, the "channel" of the available program, the scheduled broadcast start time, the scheduled broadcast end time, the date of presentation, and optionally some amount of supplemental information (such as a brief description of the media content event). The EPG is interactive with the user. The user, by actuating one or more of the controllers 150 on their remote control 148, is able to "scroll" or "navigate" about the EPG to select a program of interest.

The presented EPG indicates to the user media content events that are currently being broadcast. The EPG also indicates media content events that are scheduled for future broadcast by the media content provider. Assuming that the actual broadcast times of media content events are on schedule, the scheduled broadcast start and end times indicated on the EPG correspond closely to, or may even be identical to, the actual broadcast start and end times.

The user may be interested in viewing a particular media content event that is scheduled for presentation at a future time. For convenience, the user may specify to the media device 102 that that particular media content event of interest should be recorded (saved into a memory medium, such as the example DVR 124). The user typically is able to navigate to and highlight (focus) onto a region of the presented EPG that is indicating the media content event of interest that the user is interested in recording. Then, the user may select a recording controller 150 on the remote control 148 to thereby instruct the media device 102 of their specification to record that particular media content event of interest.

In response to receiving the user specification for a recording of a particular media content event, the media device 102 accesses the EPG information 140 to retrieve the scheduled broadcast start time, the scheduled broadcast end time, and the channel that is providing the broadcast of the specified media content event of interest. The scheduled broadcast start time is used to define the recording start time (these times are typically the same time, though some amount of time may be optionally added to advance the recording start time ahead of the scheduled broadcast start time by some relatively small predefined duration). Similarly, the scheduled broadcast end time is used to define the recording end time (these times are typically the same time, though some amount of time may be optionally added to delay the recording end time behind of the scheduled broadcast end time by some relatively small predefined duration). The recording start time, the recording end time, and the channel identifier are stored into the recording information 138 portion of memory 120. Additionally, a closing credits monitor time may be determined and then may be saved by some embodiments of the end of recording management system 100. In some embodiments of the media device, the user may manually specify the recording start and end times, and the channel identifier.

The system clock 130 provides information corresponding to the current real time. The system clock 130 may be implemented as hardware, software, or a combination of hardware and firmware in the various embodiments. The processor system 118, executing the media device logic 134 in an example non-limiting embodiment, monitors the real time provided by the system clock 130. That is, the current real time is compared with the stored recording start time.

When the real time reaches (matches) the recording start time, the processor system 118 operates the tuner 116a to tune to the media content stream 104 having the identified channel that is broadcasting the specified media content event of interest that is to be recorded (based on the stored recording start time and channel identifier). The processor system 118 then parses out the media content event of interest from the media content stream 104, and stores (records) the media content event of interest into the DVR 124 (or into another suitable memory medium). The storing of the media content event of interest continues as it is being received in the media content stream 104.

The processor system 118 continues to monitor the real time provided by the system clock 130. When the real time reaches the recording end time, embodiments of the end of recording management system 100 may end the recording process if the end of recording management system 100 is not activated (inactive state, or in a non-operational mode).

However, if the end of recording management system 100 is activated (operating in an active state, or in an operational mode), at some point in time prior to the recording end time, the video content of the recording media content event of interest is monitored to identify the closing credits text 154. This period of monitoring before the recording end time is defined as the closing credits monitoring period. The point in time that embodiments of the end of recording management system 100 begin to monitor the video content of the currently recording media content event is defined as the closing credits monitor time.

The closing credits monitor time and/or duration is predefined based on typical times that the closing credits portion of the media content event are likely to be shown. For example, the closing credits monitor time may be defined to be five minutes before the recording end time. Any suitable closing credits monitor time and/or duration may be used in the various embodiments.

During the closing credits monitoring period, at some point in time, the initial presentation of the closing credits text 154 is identified in the video information of the recording media content event of interest. In response to identifying the occurrence of the presentation of the closing credits, the end of recording management system 100 initiates one of a variety of different processes to end the recording of the media content event of interest.

One skilled in the art appreciates that monitoring video content for text may be a computationally intensive activity. Accordingly, embodiments of the end of recording management system 100 use the closing credits monitor time to initiate the analysis of the video content. For example, a selected media content event of interest may be an hour-long serial program that has a scheduled broadcast start time of 8:00 p.m. and a scheduled broadcast end time of 9:00 p.m. When the media device is configured to record that media content event, the recording start time is set to 8:00 p.m. and the recording end time is set for 9:00 p.m. Thus, the closing credits monitor time might be defined to be at 8:55 p.m. Since the closing credits monitor period is a small fraction of the total duration of a media content event, computation resources required of the processor system 118 can be significantly reduced by monitoring the last few minutes of the media content event (as compared to monitoring for the closing credits text 154 over the entirety of the media content event).

Example embodiments are configured to access the recording end time and/or the scheduled broadcast end time, and then subtract the closing credits monitor duration there from to determine the closing credits monitor time. Accordingly, the closing credits monitor time is in advance of the scheduled broadcast end time and/or the recording end time by the predefined closing credits monitor time duration. That is, embodiments of the end of recording management system 100 start the monitoring process of the video content of the currently recording media content event when the real time reaches the determined closing credits monitor time.

If in the above hypothetical example, there have been no programming delays, it is highly likely that the detecting of the closing credits text 154 will occur at a time that is very near, but at least prior to, the scheduled 9:00 p.m. broadcast end time and/or the recording end time (and thus, be near the actual broadcast end time). Here, the recording will most likely include the concluding portion of the media content event of interest.

However, if there has been a delay in the broadcast of the concluding portion of the media content event of interest, the closing credits will not be detected by the end of recording management system 100 (since the closing credits will only be presented near the very end of the media content event). For example, the media content event of interest may be a sporting event that runs beyond its scheduled broadcast end time due to additional play during one or more overtime periods. As another example, an intervening news break may have interrupted broadcast of the media content event, thereby delaying the broadcast of the concluding portion of the media content event of interest. In such situations, recording of the media content event of interest continues beyond the recording end time because the closing credits text 154 is not yet detected. At some point, the closing credits text 154 will be eventually detected by the end of recording management system 100. Since recording has not been stopped based on the previously defined scheduled broadcast end time and/or the previously defined recording end time, the ending portion of the currently recording media content event (interchangeably referred to herein as the "concluding portion" of the media content event) will have been recorded.

In practice, when the real time provided by the system clock 130 reaches the determined closing credits monitor time, and if the end of recording management system 100 is in an active mode of operation, the processor system 118, executing the frame grabber logic 134, begins to serially access currently received image frames from the currently recording media content event. In the various embodiments, the frame grabber logic 134 may be executed as software, firmware, or a combination of software and firmware. Further, the frame grabber logic 134 may be stored in other memory media in some embodiments.

Once a particular image frame has been "grabbed" (accessed from the processed stream of image frames of the currently recording media content event), the content of the image frame is analyzed to identify any text that has been included in the analyzed image data. Any suitable image processing technique may be used by the various embodiments to identify portions of an image that may correspond to text. In the various embodiments, the end of recording processing logic 146, acting in cooperation with the OCR logic 142, then identifies any text in an analyzed image. That is, the OCR logic 142 is then used to determine individual characters and/or the words of any identified text. Any suitable OCR logic 142 may be used in the various embodiments.

One skilled in the art appreciates that not all identified text in an analyzed image frame may be text associated with closing credits. For example, the hypothetical illustrated image presented on the display 114 in FIG. 1 illustrates a woman walking down a city street looking upwards at a street sign 156 (with the text "Main Street"). Here, the text "Main Street" is likely to be recognized when the image frame is analyzed. However, this identified text is not related to the text of any presented closing credits. Accordingly, embodiments of the end of recording processing logic 146 are configured to discern identified text that is not related to the closing credits from identified text of the closing credits.

In the illustrative example of FIG. 1, when the process of monitoring image frames begins (when the real time reaches the closing credits monitor time), the closing credits text 154 will most likely not have yet been included in that first analyzed image frame. Since the end of recording management system 100 is able to identify the text "Main Street" in the first analyzed image, and then determine that the text is not text associated with the closing credits portion of the currently recording media content event, the process of ending the recording of the media content event will not be yet initiated.

At some point in time, the currently recording media content event will approach its ending, wherein the closing credits portion of the media content event will begin such that the closing credits will be presented on the display 114. At that time, or shortly thereafter, an image frame will be grabbed for analysis. The analysis will identify text that is being presented in that particular image frame. In the hypothetical example of FIG. 1, the text "Main Street" is likely to be identified, and the text "closing credits text" shown in the closing credits text 154 region on the presented image is identified. Here, the identified text "Main Street" will be discriminated from the identified text "closing credits text." Further, the identified text "closing credits text" will be recognized as being text in the closing credits portion of the media content event. Accordingly, embodiments of the end of recording management system 100 may then begin the process of ending the recording of the media content event (in response to identifying the occurrence of the closing credits text 154 region on the presented image).

The text of the closing credits is known to have attributes that are unique to closing credits. Further, attributes of portions of the image in close proximity to the identified closing credits text are known. Thus, embodiments of the end of recording management system 100 compare one or more attributes of any identified text, and/or attributes of portions of the image in close proximity to the identified text, to determine if the identified text is likely to be text of the closing credits.

The determination of whether identified text are part of the closing credits is based on a comparison of the attributes of the identified text (and/or portions of the image in close proximity to the identified text) with corresponding predefined attributes. These attributes that are associated with the closing credits may be stored in the closing credits database 144.

A first exemplary closing credits attribute is size of the characters of the identified text. Here, the text "Main Street" is relatively small, and the size of the "closing credits text"

is relatively larger. Thus, a size attribute may be used to discern closing credits text from other text identified in an analyzed image frame. A first size attribute may be text character height and/or width. Accordingly, a comparison is made between the identified text attributes and the corresponding predefined attributes. If the height and/or width of an identified text character is at least equal to a predefined minimum text height and/or minimum width threshold, then the identified text character may be associated with the closing credits. If the size of the identified text character is smaller than the minimum text height and/or width threshold, the identified text character may be disregarded (not associated with the closing credits).

Conversely, if the height and/or width of the text character is less than a predefined maximum text height and/or maximum width threshold, then the identified text character may be associated with the closing credits. If the size of the identified text character is greater than the maximum text height and/or width threshold, the identified text character may be disregarded (not associated with the closing credits). Any suitable predefined maximum and/or minimum character height and/or width may be used as a threshold value in the various embodiments.

A second exemplary closing credits attribute is the number of identified text characters and/or words in a string of identified text. For example, the text "Main Street" only has two words (and nine text characters). In contrast, the "closing credits text" has three words and eighteen text characters. If the predefined number of words threshold is three, the identified "closing credits text" may be associated with the closing credits since three words are identified (since the number of words is at least equal to the threshold). Alternatively, or additionally, if the predefined number of text characters threshold is fifteen characters, the identified "closing credits text" may be associated with the closing credits since eighteen text characters are identified. Any suitable predefined number of words and/or text characters may be used as a threshold value in the various embodiments.

Another exemplary closing credits attribute is the font type of the text characters of the identified text. Here, the "closing credits text" is presented using a text font defined by capital letters, is italicized, is bolded, and is of an Arial font type. Thus, one or more text font attributes may be used to discern closing credits text from other text identified in an analyzed image frame. A comparison is made between the identified text font attributes and the corresponding predefined text font attributes. If the font of the text characters is the same as one or more predefined text font characteristics, then the identified text may be associated with the closing credits. Any suitable predefined text font characteristic may be used as a threshold attribute in the various embodiments Another closing credits attribute pertains to portions of the image in close proximity to the identified text. Typically, closing credits may be presented over a solid colored background. That is, the background pattern of a portion of the image in proximity to the identified text has a solid background pattern. In the hypothetical example illustrated in FIG. 1, the "closing credits text" is presented on top of a solid white background. Accordingly, portions of the image in close proximity to identified text are evaluated to determine if the portions are of a solid color. For example, image portions between individual text characters may be evaluated. Alternatively, or additionally, image portions above and/or below identified text characters by some predefined distance of the identified text, or image portions that are within some predefined distance of the identified text, may be evaluated. These predefined distances from identified text may be used to define a bounded region in some embodiments.

One skilled in the art understands that an image is comprised of a matrix of pixels. Different colors, intensities, or other characteristics of the pixels are varied to create an image. Here, the boundaries or extent of the identified text having common characteristics (such as character size and/or color) is determined. A region bounding the identified text (surrounding the identified text) may be defined based on one or more predefined distances.

In a first example discrimination test, the pixels (image data) in the determined bounded region (that are not those pixels that are used to present the identified text) are evaluated to determine if they are of the same, or substantially the same, color. If the pixels are of the same or substantially same color, then a determination is made that the identified text is being presented over a solid background. In contrast, portions of the image in close proximity to any random text identified in a filmed scene of the media content event is not likely to have the same color. Therefore, a first indication that identified text may be part of the closing credits is made when the portions of the image in close proximity to the identified closing credits text have the same color. (Here, both the "closing credits text" and the text "Main Street" are presented on a solid grayscale background. So, this particular attribute may be, by itself, sufficient to determine that the "closing credits text" is associated with the closing credits and to determine that the text "Main Street" is not associated with the closing credits.)

A pixel color is typically defined based on a numerical value that specifies red, blue and green color components. Various pixel colors definitions are stored in a color palette. In an example system, the color pallet defines 256 different colors using numerical values. In an embodiment that determines the numerical value of the color of the pixels in close proximity to the identified text, the determined pixel color values are compared to one or more predefined pixel color values stored in the closing credits database 144.

In a second example discrimination test, the determined color values for pixels in the portions of the image in close proximity to the identified text are compared with predefined pixel color values stored in the closing credits database 144. Typically, closing credits may be presented on a which background, a black background, a blue background, or the like. Thus, the color values of these typically used backgrounds may be determined and then stored in the closing credits database 144. In an analyzed image frame, if the identified pixel color values of the pixels in proximity to identified text match, or substantially match, with at least one of the predefined pixel color values retrieved from the closing credits database 144, then the text in proximity to those pixels may be associated with the closing credits.

Another closing credits attribute pertaining to the color of the identified text. Typically, the text of the closing credits may be presented using a particular color and/or the same text color. In the hypothetical example illustrated in FIG. 1, the "closing credits text" is presented using a black text color. Further, all of the text characters are presented using a black color. Accordingly, the pixels of the identified text are evaluated to determine if the pixels are of a predefined color. For example, a predefined threshold color may be black or another predefined color. Thus, in the hypothetical example of FIG. 1, the "closing credits text" may then be determined to be associated with the closing credits. However, the text "Main Street" is also presented using black text. So, this particular attribute may not be, by itself, sufficient to determine that the "closing credits text" is associated with the closing credits and to determine that the text "Main Street" is not associated with the closing credits. Accordingly, various embodiments may optionally employ a plurality of different image attributes to determine if the closing credits are being presented in an analyzed image frame. Any suitable predefined number of colors may be used as a threshold text pixel color value in the various embodiments.

A particular media content event will present its particular closing credits using particular attributes. Based on the actual attributes used to present a particular media content event, these attributes may be communicated to the media device 102 and then may be stored into the closing credits database 144. For example, the characters of the text of the closing credits may be known to be of a particular height and/or width, and/or of a particular color, and/or of a particular font type. As another example, the closing credits may be known to be presented on a solid background of a particular color. Thus, when the closing credits text 154 is identified, the predetermined stored closing credits attributes may be retrieved for that particular recording media content event. Then, attributes of identified text in an analyzed image frame can be compared with corresponding predefined closing credits attributes for that particular media content event. If there is a match between one or more of the determined closing credits attributes and a corresponding predefined closing credits attribute, then a determination is made that the closing credits have been identified.

In an example embodiment, the identifier of a particular media content event and associated information specifying one or more predefined closing credits attributes are communicated to the media device. The received predefined closing credits attributes and the associated media content event identifier are saved into the closing credits database 144 in the memory 120 or in another suitable memory medium. Attributes pertaining to identified text, and/or of portions of the image in proximity to the identified text, are determined and then compared with the predefined closing credits attributes retrieved from the closing credits database 144. The predefined closing credits attributes are retrieved based on the identifier of the currently recording media content event which is also found in the closing credits database 144. That is, a list of all media content event identifiers are searched in the closing credits database 144 until a match is found with the identifier of the currently recording media content event. Once the matching media content event identifier is found in the closing credits database 144, the associated predefined closing credits attributes are retrieved for comparison with any text attributes identified in an analyzed image frame.

For example, the closing credits database 144 may have stored the identifier of the example media content event that is being currently recorded in the hypothetical example of FIG. 1, along with the following predefined closing credits attributes: a white colored solid background, a blue colored text font, a capital letter text format, a bold text font, an italicized text font, and an Arial font style. When the "closing credits text" is identified in an analyzed image frame, the predefined closing credits attributes may be retrieved from the closing credits database 144 for that particular media content event. In the hypothetical example of FIG. 1, the identified "closing credits text" is presented using all capital letters, is presented using a bold text font and an italicized text font, is presented using an Arial font style, and is presented over a solid white colored background using a blue color. Thus, the closing credits attributes of the identified "closing credits text" identified in an analyzed image frame matches the predefined closing credits attributes stored retrieved from the closing credits database 144. Therefore, the "closing credits text" may be determined to be part of the closing credits for the currently recording media content event.

In contrast, the text "Main Street" is not presented using bold or italicized font, and is not presented on a solid white colored background. That is, the text "Main Street" does not match the predefined closing credits attributes for that identified media content event (wherein the associated closing credits have been retrieved from the closing credits database 144). Accordingly, the text "Main Street" is not determined to be associated with the closing credits of the currently recording media content event.

The predefined closing credits attributes for a plurality of media content events may be communicated to the media device 102 in a variety of manners. An example embodiment communicates the predefined closing credits attributes in the metadata of the media content event. Such predefined closing credits attribute information may be periodically repeated in the metadata of the broadcasting media content event so that when the media content event is recording, the media device accesses the predefined closing credits attributes. Alternatively, the predefined closing credits attributes may be communicated in other portions of the media content stream 104 and/or in other portions of the streaming media content event itself.

Alternatively, or additionally, the predefined closing credits attributes may be included in the EPG information that is periodically communicated to the media device 102. The predefined closing credits attributes may be optionally retrieved from the received EPG information and saved into the closing credits database 144. Thus, when the user selects a particular media content event for recording, the predefined closing credits attributes may be retrieved from the EPG information 140 and/or the closing credits database 144. The predefined closing credits attributes may be retrieved when the recording start and end times are determined from the scheduled broadcast start and end times, and then saved into the recording information 138 in some embodiments. Alternatively, or additionally, the predefined closing credits attributes may be retrieved by some embodiments from the EPG information 140 and/or the closing credits database 144 at the time of recording, during the recording, or in response to the current time of the system clock 130 reaching the closing credits monitor time.

Other attributes of identified text may be considered by some embodiments. For example, closing credits typically scroll over the display 114 in an upward or downward direction. Further, the text scrolling also typically occurs at a constant rate. For example, a series of successive image frames may be periodically grabbed for analysis by the end of recording management system 100. The separation duration between the periodically analyzed successive image frames is determined (for example, using image frame time stamps or image frame PID information). Alternatively, successive image frames may be grabbed based on some predefined duration, such as every second, every several seconds, or every fraction of a second. Any suitable separation duration between grabbed image frames may be used in the various embodiments.

When a first one of the grabbed image frames is determined to have text thereon, a presentation location of the one or more characters and/or words of the identified text (or a portion thereof) on the display 114 is identified. Then, the location of the same text character and/or word in a next analyzed grabbed image frame is determined. A change of location between the text character and/or word is determined, such that the distance of location change is determined. The distance change and the duration between analyzed image frames are then used to compute a rate of movement of the text (the rate of scrolling).

Alternatively, or additionally, the direction of the scrolling text may be determinable. Once the location of identified text in successive analyzed image frames have been determined, a direction of movement of the text can be determined. That is, a determination can be made whether the text is scrolling in an upward direction or a downward direction. The known direction of scrolling of the closing credits text may be stored in the closing credits database 144 for the particular media content event that is being recorded. If the scrolling direction of the identified text matches the predefined scrolling, a determination is made that the closing credits have been identified.

For reliability purposes, other subsequent image frames are similarly analyzed to ensure that the computed rate of movement and/or the determined direction of movement of the identified text character and/or word is consistent and/or constant (thereby distinguishing from random movement of the identified text character and/or word that may result from camera movement which occurred during the filming of the media content event).

In some situations, a series of pages of closing credits are presented using a paging process, wherein the pages of closing credit information are serially presented for some predefined duration on a periodic basis. For example, a new page of closing credits information may be presented every five seconds. Accordingly, an example embodiment may evaluate how any presented identified text is changing over time. If the identified text is determined to be paging, the identified text may be determined to be part of the closing credits. Otherwise, the identified text may be disregarded.

Paging information of the closing credits for a particular media content event that is recording may be predetermined then stored in the closing credits database 144. The paging information may include a rate of paging and/or a duration of presentation of a page of closing credits. The predefined paging information may be communicated in any suitable fashion, such as in the EPG information. Or the predefined paging information may be separately communicated. The predefined paging information may be accessed or retrieved and then compared with any identified text in a series of analyzed image frames.

Yet another closing credits attribute is the particular location and/or particular region of an image in which the closing credits are presented on the display 114. For example, the closing credits may be shown in the lower (or upper) half or quarter of the image when presented on the display 114. The other region of the image presented on the display 114 may be used for other purposes, such as presentation of an advertisement, presentation of a trailer for the next scheduled media content event, or the like. In such situations, the location information of the presentation of the closing credits is known based on the presentation plans of the media content provider. Accordingly, predefined presentation location information for the closing credits may be communicated to the media device 102. The predefined presentation location information of the closing credits may then be retrieved and compared with the determined location of the identified text in the analyzed image frame. If the locations match, then the identified text may be determined to be part of the closing credits.

In some embodiments, the closing credits typically containing one or more generic keywords and/or generic keyword phrases that are commonly used during presentation of the closing credits. Such commonly used generic keywords and/or generic keyword phrases may be used as a closing credits attribute. Example generic keywords include such words as, but not limited to, director, actor, location, or the like. Generic keyword phrases may also be used in the closing credits, such as, but not limited to, the phrase "directed by" or the like. Such keywords and/or keyword phrases are not likely to randomly occur outside of the presented closing credits. Thus, words and/or phrases of the text identified in an analyzed image frame may be compared to generic keywords and/or generic keyword phrases, and if a match is determined, the closing credits may be identified by the end of recording management system 100.

As another example, well known individuals participating in the production of the media content event may be identified in the closing credits, such as, but not limited to, director names, producer names, actor names, or the like. For example, a generic-type listing of known actors (which may include the names of hundreds, or even thousands of actors) may be stored in the closing credits database 144. Thus, identified words and/or phrases identified in an analyzed image frame may be compared with the generic-type predefined keywords and/or keyword phrases stored in the closing credits database 144. When a match is found between one or more identified words and/or phrases in an analyzed image frame and corresponding actor name stored in the closing credits database 144, a determination is made that the closing credits have been identified.

In some embodiments, actual closing credits keywords and/or keyword phrases may be known for a particular media content event. For example, the actual closing credits may be known to have keywords and/or keyword phrases stating that the media content event was "Directed by John Smith" or the like. Or, the actress "Jane Doe" may be one of the known performers in the currently recording media content event. The identity of particular individuals uniquely associated with a known media content event may be stored in the closing credits database 144. When text is identified in an analyzed frame, the words and/or phrases of the identified text are compared with the known (predefined) individuals. (Here, the names of individuals is a type of closing credits attribute.)

Another example of a closing credits attribute may be an icon or the like. For example, a particular production company that produces media content events may have a notoriously well known icon, which is a symbol or the like that is associated with that particular production company. Often, the icon may be included as part of the closing credits of the currently recording media content event. The icon would not typically be presented at other times during the ending portion of the media content event that is evaluated when the closing credits monitor period begins. Thus, if the icon is detected in an analyzed image frame, the closing credits of the currently recording media content event may be identified by the end of recording management system 100. In an example embodiment, a plurality of known (predefined) icons are stored in the closing credits text 154. Alternatively, when the particular actual icon is known for the currently recording media content event, that particular icon may be compared with any identified icons found in an analyzed image frame.

It is appreciated by one skilled in the art that the occurrence of presentation of the closing credits must be determined with a high degree of accuracy and certainty. Otherwise, the recording of the media content event may be unintentionally stopped before the ending of the media content event. Accordingly, some embodiments are configured to compare identified text in an analyze image frame with a plurality of different closing credits attributes. If all of the closing credits attributes match the characteristics of the identified text, then the closing credits of the currently recording media content event will have been accurately and reliably determined. In some embodiments, a predefined percentage match between the identified text and the plurality of closing credits attributes is required to determine that the closing credits are being present in the currently recording media content event. For example, an 80% match between the identified text and the plurality of closing credits attributes may be sufficient to conclude that the closing credits have been reliably identified. Any suitable percentage match threshold may be used in the various embodiments.

In some embodiments, the media device 102 may be optionally configured to establish communications with a remote electronic device. In such media device embodiments, the end of recording management system 100 may cause the media device 102 to establish a communication link 158, via the communication network 160, to a remote closing credits database 162. The remote closing credits database 162 may reside in any suitable remote electronic device 164, such as, but not limited to, an internet site, a server, or the like. Then, one or more closing credits attributes may be communicated to and received at the communication system interface 132 of the media device 102. The closing credits attributes received from the remote closing credits database 162 may then be used and/or stored for comparison with text identified in an analyzed image frame.

The predefined closing credits attributes may be retrieved from the remote closing credits database 162 at any suitable time. An example embodiment retrieves one or more of the predefined closing credits attributes from the remote closing credits database 162 in response to the user requesting a recording of a particular media content event. In an example embodiment, the media device 102 may communicate a request that includes the identifier of the currently recording media content event (or the media content event scheduled for recording) to the remote closing credits database 162. The received media content event identifier is used by the remote closing credits database 162 to retrieve one or more stored predefined closing credits attributes, which are then communicated back to the requesting media device 102. The request may be communicated by the media device 102 at any suitable time, such as prior to the start of the recording of the media content event. Alternatively, or additionally, the media device 102 may communicate the request for the predefined closing credits attributes when the recording of the media content event begins or is underway.

The communication network 160 is illustrated as a generic communication system. In one embodiment, the communication network 160 comprises a cellular telephone system, such as a radio frequency (RF) wireless system. Accordingly, the media device 102 includes a suitable transceiver. Alternatively, the communication network 160 may be a telephony system, the Internet, a Wi-fi system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the media device 102 may be implemented to communicate using other types of communication technologies, such as but not limited to, digital subscriber loop (DSL), X.25, Internet Protocol (IP), Ethernet, Integrated Services Digital Network (ISDN) and asynchronous transfer mode (ATM). Also, embodiments of the media device 102 may be configured to communicate over combination systems having a plurality of segments which employ different formats for each segment that employ different technologies on each segment.

In some embodiments, the media content event may be broadcast using an Moving Pictures Expert Group (MPEG) format or similar media content format. Such media content formats comprise different image frame types, such as an I-frame (intra coded frame or slice), a P-frame (predicted frame of slice) and a B-frame bi-directional predicted frame or slice), that are compressible to different degrees. The I-frame is the least compressible image frame, but does not require other video image frames to decode. That is, an entire image may be determined from a single I-frame. The P-frame may use data from previous I-frames to decompress and are more compressible than an I-frame. The B-frame can use both previous and forward frames for data reference to get the highest amount of data compression. Other compression techniques may be used to compress the images of the media content event. As used herein, a complete video image frame corresponds to a substantially complete set of data or information that may be used, by itself, to generate an image of the media content event. If other compression formats are used, such formats from time to time have a frame that corresponds to a complete video image frame. In the various embodiments, after the closing credits monitor time wherein the concluding portion of the media content event is evaluated to identify the closing credits, individual image frames are periodically grabbed for analysis. In a preferred embodiment, the I-frames or other image frames with complete data are grabbed for analysis. However, other image frames may be analyzed in other embodiments.

In response to identifying the closing credits in the currently recording media content event, the process of ending the recording of the media content event may be initiated by embodiments of the end of recording management system 100. After the closing credits are identified, a stop recording command is generated. In the various embodiments, in response to the generation of the stop recording command, the processor system 118 then stops the recording of the currently recording media content event in response to generation of the stop recording command. Any suitable command may be used to stop, halt, end or otherwise conclude the recording of the media content event In some example embodiments, the recording of the media content event is stopped nearly immediately after determining the occurrence of the closing credits. In such embodiments, when the occurrence of the closing credits are detected, a stop recording command or the like is immediately generated. Thus, the recording process ends nearly immediately in response to detecting the occurrence of the closing credits.

In other embodiments, detection of the closing credits does not necessarily immediately terminate the recording of the currently recording media content event. Rather, the actual recording process ends at some later time. One skilled in the art appreciates that presentation of all of the closing credits requires some amount of time (which may vary for different media content events). Thus, it is desirable to end the recording process at some point in time after the initial detection of the closing credits. That is, the recording process ends at some point after the conclusion of the closing credits portion of the media content event.

In an example embodiment, a presentation time (or the actual time) of the initial detection of the closing credits is compared to the stored recording end time. If the time of the initial detection of the closing credits is in advance of the recording end time, the process of recording ends when the actual time provided by the system clock 130 reaches the recording end time (which was previously stored in the recording information 138). That is, the recording of the media content event continues until the recording end time when the time that the identified text corresponds to the closing credits occurs ahead of the recording end time.

However, if the actual time of the initial detection of the closing credits is after the recording end time, the recording has continued beyond the originally defined recording end time as intended. That is, the concluding portion of the currently recording media content event will have been successfully recorded. Here, the process of ending the recording of the media content event is only initiated in response to determining the occurrence of the closing credits.

In some situations, the process of ending the recording of the media content event is initiated after expiration of some predefined duration after the initial detection of the closing credits. For example, a predefined end recording duration of five minutes may be used to define when the recording process is initiated. Here, the recording process ends five minutes after the initial detection of the closing credits (in response to generation of the stop recording command five minutes after the initial detection of the closing credits).

In some embodiments, the user may define an end recording duration. For example, a menu or the like may be presented to the user, who then is able to specify an amount of time for the end recording duration based on their personal preferences. Alternatively, or additionally, the end recording duration may be predefined at the media device 102 (such as by the media content producer, media content provider or another entity). The end recording duration may be stored in the recording information 138, the end of recording processing logic 146, another portion of the memory 120, or in another suitable memory medium.

Any suitable end recording duration, and any suitable timing process, may be used in the various embodiments. In an example embodiment, the end recording duration is added to the actual time of the initial detection of the closing credits. This determined time is substituted for the recording end time. Alternatively, a countdown timer or the like that tracks a period of time defined by the end recording duration may be used to initiate the process of ending the recording of the media content event. When the end recording duration has expired, the stop recording command is generated.

In other embodiments, the process of ending the recording of the media content event is initiated after the end of the detection of the closing credits. Here, successive image frames are grabbed and analyzed to identify the closing credits (which are constantly changing over time). At some point, presentation of the closing credits will have concluded. At that point, the closing credits will no longer be identifiable in a next analyzed image frame. Then, the process of ending the recording of the media content event is initiated (by generation of the stop recording command).

Changes in monitored closing credits attributes may be used in some embodiments to identify the actual end or the media content event. For example, the background pattern and/or color may change in subsequently analyzed image frames, thereby indicating that the end of the closing credits have been presented. As another example, scrolling of text of the closing credits may stop. Thus, a change in the closing credits attributes may indicate an end of the media content event such that the process of ending the recording of the media content event is initiated.

Other image characteristics may be evaluated to identify the end of the media content event. In an example embodiment, content of a grabbed image frame is analyzed to identify image characteristics of that image frame. An absence or presence of, and/or the quantity of, a particular type of image characteristic may be used to determine the end of presentation of the closing credits. Examples of image characteristics that may be analyzed include, but are not limited to, bit number, bit depth, color palette, color balancing, and/or degree of noise reduction. Edge analysis and/or motion vector analysis may be performed on an image to identify edge and/or motion vector characteristics of the objects in the image. Here, a series of successive image frames are analyzed and compared with each other. Any suitable image characteristic may be analyzed to determine the end of presentation of the closing credits, which is understood to be the end of the media content event.

For example, the number of edges and/or motion vectors of a image frame may be determined. A scene having a large number of edges in one image frame, or a large number of moving edges in a series of image frames, may tend to indicate a scene type with a relatively large amount of activity (a high activity frame). In contrast, closing credits are more likely to have fewer moving edges and/or motion vectors. Accordingly, a transition from a relatively small number of edges and/or motion vectors tends to a large number of edges and/or motion vectors tends to indicate an end in presentation of the closing credits. In response to such identified transitions (a relatively large increase) in the number of edges and/or motion vectors between successive analyzed image frames, the process of ending the recording of the media content event may then be initiated.

In some embodiments, a change in the audio portion of the received stream of media content may be used to identify the end of the currently recorded media content event. For example, a particular song or the like may be presented during presentation of the closing credits. When the song ends, a period of silence, a different song, on entirely different dialogue may be detectable, thereby indicating that the media content event has ended. Accordingly, the process of ending the recording of the media content event is initiated.

However, many embodiments preferably do not analyze the audio portion of a media content event. Often, the media content provider may continue presentation of the end of the video portion of the currently recorded media content event in a small portion of the display 114 while concurrently presenting a video portion of an advertisement, a trailer for the next scheduled media content event, or the like in the remaining portion of the display 114. Often, the audio portion of the advertisement, trailer for the next scheduled media content event, or the like is presented (while the audio portion of the currently recorded media content event is muted). Here, such analysis of the audio portion may erroneously imply that the currently recorded media content event has ended.

In some situations, the closing credits are not detected by the end of recording management system 100. In such situations, the process of ending the recording of the media content event is initiated after some predefined default duration. For example, the predefined default duration may be one hour. Thus, even if no closing credits are detected, the recording of the media content event ends. Such a default feature may be user selectable and/or may be user defined.

In other situations, attributes of a next received media content event may be detectable. For example, a packet identifier (PID), or other information in the metadata of the received stream of media content (the title, the supplemental descriptive information, or the like) may indicate that a different media content event is currently being received. Accordingly, the process of ending the recording process is initiated when the next media content event becomes identified.

In some situations, back-to-back recordings of different media content events may be scheduled, wherein the different media content events are to be received on different channels. In media devices 102 that have multiple tuners 116a, the end of recording management system 100 may be operational since different media content events may be recorded by different tuners.

However, some media devices 102 have only a single tuner. Thus, if the closing credits are detected after the recording end time, the beginning portion of the next media content event scheduled for recording will be omitted (since the single tuner 116a is recording the end of the currently recording media content event). In such embodiments, the end of recording management system 100 may be deactivated when a conflict in back-to-back media content event recordings occurs. In other embodiments, the user may be notified of the potential conflict, and the user may opt to activate or deactivate the end of recording management system 100.

Similarly, a requested number of recordings of different media content events may exceed the number of available tuners 116a for recording. Further, one of the tuners 116a may be used for presenting a media content event to the user while the recordings are underway. In such situations, the end of recording management system 100 may be selectively deactivated for one or more of the recording media content events. For example, the last scheduled media content event may be recorded with the end of recording management system 100 deactivated for that particular recording process. Or, the potential conflict in recordings may be indicated to the user, who may then decide with of the recordings will have the end of recording management system 100 enabled.

It should be emphasized that the above-described embodiments of the end of recording management system 100 are merely possible examples of implementations of the invention. Many variations and modifications may be made to the above-described embodiments. All such modifications and variations are intended to be included herein within the scope of this disclosure and protected by the following claims.

The invention claimed is:

1. A method that records media content events using a media device, the method comprising:
    recording, by the media device, a media content event that is being received by the media device, wherein the broadcast of the media content event is associated with at least a scheduled broadcast start time defining when the broadcast of the media content is scheduled to begin and a scheduled broadcast end time defining when the broadcast of the media content event is scheduled to end;
    analyzing each image frame of subsequently received image frames from the media content event by the media device in response to detecting that time has reached a predefined closing credits monitor time, wherein the closing credits monitor time is prior to the scheduled broadcast end time, and wherein for each analyzed image frame of the subsequently received image frames, the method further comprises:
    analyzing, by the media device, the image frame to identify an occurrence of an attribute in the analyzed image frame, wherein the attribute is an icon associated with one of a plurality of production companies that produce the media content events;
    comparing, by the media device, the attribute in the analyzed image frame with a corresponding predefined closing credits attribute retrieved from a memory medium of the media device, wherein the attribute is an predefined icon associated with a production company that produced the media content event that is shown in the closing credits of the media content event that is being recorded, and wherein the corresponding predefined closing credit attribute is received in at least one of electronic program guide (ERG) information and information from a remote electronic device with a remote closing credits databased of predefined closing credits attributes, and wherein the received predefined closing credits attribute is stored in the memory medium prior to the analyzing each image frame of subsequently received image frames for comparing with the icon that has been identified in the analyzed image frame of the media content event being recorded;
    determining, by the media device, that the analyzed image frame includes closing credits of the media content event when the attribute in the analyzed image frame matches the corresponding predefined closing credits attribute; and
    initiating an end of the recording of the media content event in response to determining that the identified attribute in the analyzed image frame corresponds to the predefined closing credits attribute.

2. The method of claim 1, further comprising: receiving, by the media device, the predefined icon associated with the production company that produced the media content event that is being recorded, wherein the predefined icon associated with the production company is received prior to the analyzing each image frame of subsequently received image frames;
    storing the predefined icon associated with the production company in the memory medium of the media device; and
    retrieving the predefined icon associated with the production company from the memory medium of the media device to compare the identified icon in the analyzed image frame with the predefined icon associated with the production company.

3. The method of claim 2, wherein the predefined icon associated with the production company is received in electronic program guide (EPG) information that is periodically communicated to the media device.

4. The method of claim 2, wherein the memory medium of the media device is a first memory medium, and wherein the predefined icon associated with the production company that resides in the remote closing credits database is stored in a second memory medium of the remote electronic device that is remote from the media device, the method further comprising:
    communicating a request from the media device to the remote electronic device, wherein the request identifies the recording media content event; and
    receiving, at the media device, information comprising the predefined icon associated with the production company from the remote electronic device, wherein the predefined icon is retrieved from the second memory medium and is communicated from the remote electronic device to the media device in response to communicating the request.

5. The method of claim 2, wherein the predefined icon associated with the production company is included in a portion of the broadcasting media content event that is being received and recorded by the media device, and wherein the portion with the predefined icon associated with the production company is received at the media device prior to a start of the closing credits monitor time.

* * * * *